United States Patent [19]

Clark

[11] 4,081,617
[45] Mar. 28, 1978

[54] ELECTRONIC RINGING CIRCUIT FOR TELEPHONE SYSTEMS

[75] Inventor: Jeremy Clark, Montreal, Canada

[73] Assignee: Technex International Ltd., St. Laurent, Canada

[21] Appl. No.: 737,016

[22] Filed: Oct. 29, 1976

[51] Int. Cl.² .............................................. H04M 1/00
[52] U.S. Cl. ..................................... 179/84 T; 331/47
[58] Field of Search ............ 179/84 R, 84 T; 331/47, 331/108 D; 340/384 E

[56] References Cited

U.S. PATENT DOCUMENTS

| 3,867,585 | 2/1975 | Morstadt | 179/84 T |
| 3,965,307 | 6/1976 | Dimmer | 179/84 T |

*Primary Examiner*—Kathleen H. Claffy
*Assistant Examiner*—Joseph A. Popek

[57] ABSTRACT

This invention relates to an electronic ringing circuit for telephone systems. The inventive circuit provides a dual tone output with the tones changing at a predetermined rate. The circuit consists of a rectifying circuit connected across the telephone lines which receive the normal 90VAC/20 Hz telephone ringing signals. The rectified signal is then connected to one input terminal of a voltage comparator, the other terminal of which is connected to a reference voltage source. When a ringing signal is present, the rectified signal will be greater than the voltage of the reference source so that the voltage comparator will provide an output. This output is fed to the control terminals of electronically controlled switches, and when the switches are closed, the oscillators will be grounded through frequency determining capacitors associated with the respective oscillators. In addition, associated with one of the oscillators is a second electronically controlled switch and a second frequency determining capacitor. The control terminal of the second switch is connected to the output of the other one of the oscillators. Thus, when a ringing signal comes over the telephone lines, both of the oscillators will be turned on. The second oscillator will switch in the second frequency determining capacitor at a predetermined rate, so that the output of the one oscillator will change at this predetermined rate to thereby provide a multi-tone signal. The output of the one oscillator is fed to a speaker.

4 Claims, 7 Drawing Figures

4,081,617

ELECTRONIC RINGING CIRCUIT FOR TELEPHONE SYSTEMS

BACKGROUND OF THE INVENTION

1. Field of the Invention

This invention relates to an electronic ringing circuit. More specifically, the invention relates to such a ringing circuit which includes means for providing a plurality of ringing frequencies, and further means for shifting from one ringing frequency to another.

2. Description of the Prior Art

The ringing circuit of present day telephones consist mainly of mechanical devices activated by an electrical ringing circuit signal coming over the telephone lines. However, telephones are becoming more and more electronic, and it is, therefore, useful to have an electronic circuit for providing the ringing signal.

In addition, present day telephones provide a jarring note mostly at one frequency. Electronic ringing circuits can provide a pleasant sound with a futuristic ring having a plurality of ringing tones.

SUMMARY OF THE INVENTION

It is, therefore, an object of the invention to provide an electronic ringing circuit.

It is a further object of the invention to provide an electronic ringing circuit having means for providing more than one ringing frequency at its output.

It is a still further object of the invention to provide an electronic ringing circuit having means for shifting the ringing frequency from one frequency to another at a predetermined rate.

In accordance with the invention, an electronic ringing circuit having two input terminals connectable to a telephone ringing circuit signal means, and two output terminals connectable to speaker means, comprises means for determining when a telephone ringing circuit signal is present at said input terminals and for providing an activating signal when said telephone ringing circuit signal is detected at said input terminals; first oscillator means, having an output terminal, for providing output signals at a plurality of frequencies one at a time; second oscillator means associated with means for changing the frequency of the output signals of said first oscillator means; means associated with said first and second oscillator means for receiving said activating signal and for turning said first and second oscillator means on on receipt of said activating signal; the output terminal of said first oscillator means comprising an output terminal of said ringing circuit.

The means for determining preferably comprises a voltage comparator having one input thereof connected to one input terminal of said ringing circuit and a second input terminal connected to said source of voltage; whereby, when a signal at the one input thereof is of greater magnitude than a signal at the second input thereof, an output signal is provided at the output of said voltage comparator, said output signal constituting said activating signal.

In a practical embodiment, a rectifier circuit is included between said input terminals of said ringing circuit and said means for determining.

The rectifying circuit may comprise a first capacitor having one end thereof connected to said one input terminal of said ringing circuit and the other end thereof connected to a pair of back-to-back Zener diodes; the other side of said pair of Zener diodes being connected to a pair of resistors, the second one of said pair of resistors being connected between the junction of said resistors and a point of common potential; a diode connected between the junction of said pair of resistors and the one input terminal of said voltage comparator; and a second capacitor connected between the other end of said diode and said point of common potential.

In one embodiment, said means for turning on said first oscillator means comprises a first controllable switch means having an input terminal, an output terminal and a control terminal, and said means for turning on said second oscillaor means comprises a second controllable switch means having an input terminal, an output terminal and a control terminal; a first capacitor, associated with said first oscillator means, being connected between the input terminal of said first switch means and said point of common potential; the output terminal of said first switch means being connected in circuit with said first oscillator means; the output terminal of said voltage comparator being connected to the control terminal of said first switch means; a second capacitor, associated with said second oscillator means, being connected between the input terminal of said second switch means and said point of common potential; the output terminal of said second switch means being connected in circuit with said second oscillator means; the output terminal of said voltage comparator being connected to the control terminal of said second switch means; whereby, when an activating signal is provided at the output of said voltage comparator, the first and second switch means are shorted to provide grounds for said first and second oscillator means respectively to turn on said first and second oscillator means.

The means for changing the frequency of the output signal of said first oscillator means may comprise a third controllable switch means having an input terminal, an output terminal, and a control terminal; the output terminal of said third switch means being connected to the input terminal of said first switch means; a third capacitor connected between the input terminal of said third switch means and said point of common potential; the output of said second oscillator means being connected to the control terminal of said third switch means; whereby, said third capacitor is switched into and out of the circuit of said first oscillator means at a rate determined by the frequency of the second oscillator means; the frequency of the first oscillator means being a function of the value of capacitance of the first capacitor when the third capacitor is switched out, and a function of the value of capacitance of the first and third capacitors in parallel when the third capacitor is switched in.

BRIEF DESCRIPTION OF THE DRAWINGS

The invention will be better understood by an examination of the following disclosure together with the accompanying drawings, in which.

DETAILED DESCRIPTION OF THE DRAWINGS

Figure 1:
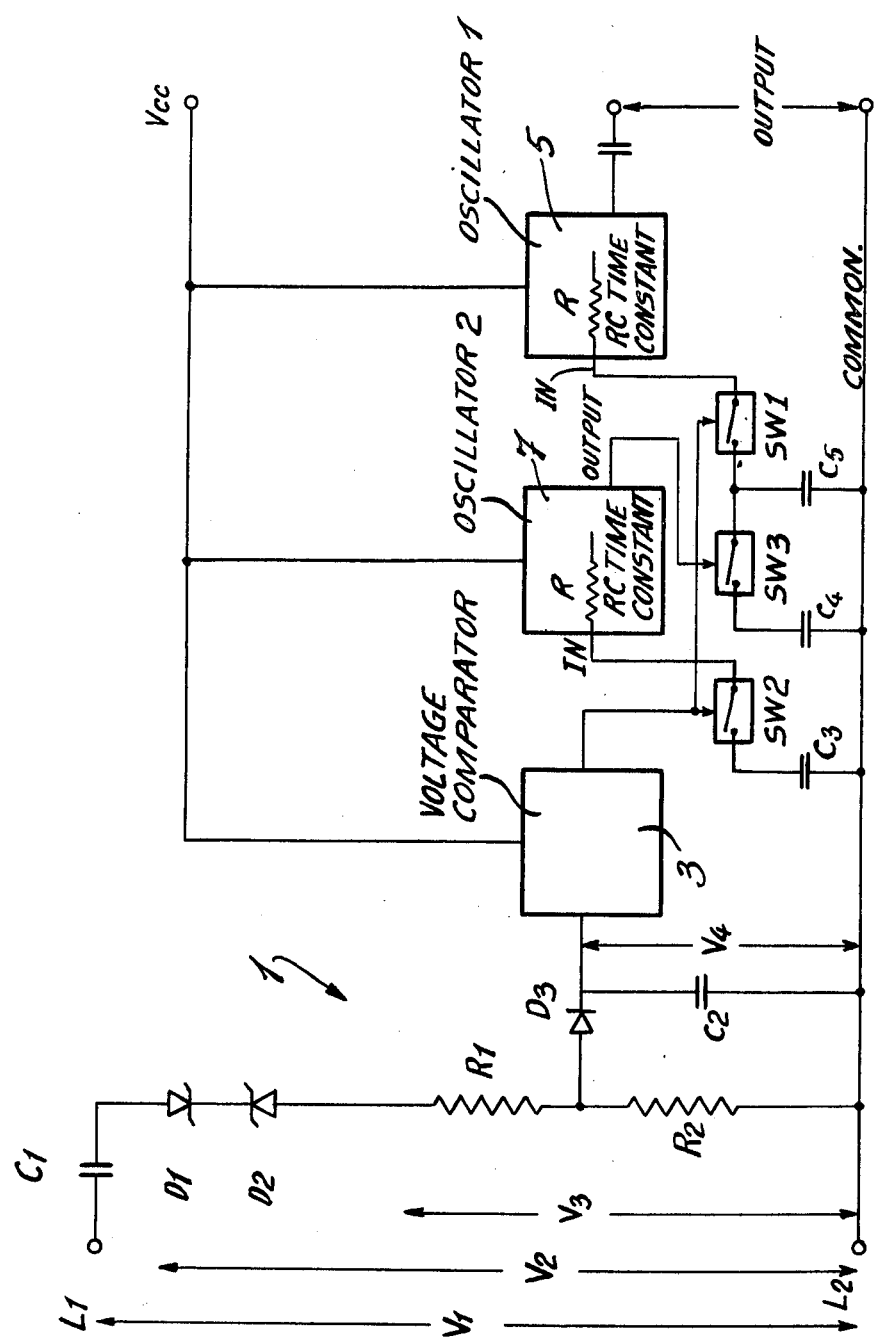
FIG. 1 illustrates one embodiment of the invention.
Figure 2A:
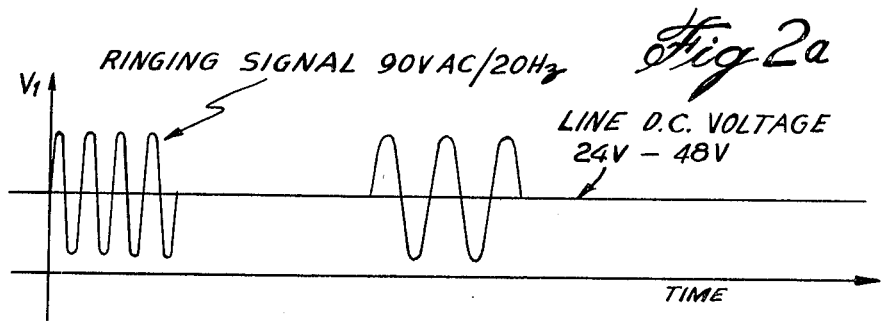
FIGS. 2A to 2F are graphs useful in explaining the operation of the circuit illustrated in FIG. 1.

Referring now to FIG. 1, the ringing circuit comprises, at the input, a rectifying circuit illustrated generally at 1. The input to the rectifying circuit and to the ringing circuit are connected across telephone lines L1 and L2 which will provide the normal 90VAC/20 Hz ringing signal as illustrated in FIG. 2A. The rectifying circuit consists of a capacitor C1, for removing the DC from the ringing circuit, and two back-to-back Zener diodes D1 and D2. One end of the pair of diodes D1 and D2 is connected to a voltage divider R1 and R2, and one side of a diode D3 is connected to the junction of the resistors R1 and R2. Capacitor C2 is connected between the other end of the diode D3 and L2 which is a line of common potential (ground).

The output of the rectifying circuit is fed to a voltage comparator 3 whose other input is fed from a source of reference potential Vcc. Such voltage comparators are well known in the art and require no further description at this point. However, as a merely illustrative example, the voltage comparator could be nothing more complicated than a transistor whose biasing circuit is arranged such that when the rectifying input is greater than the reference input, then the transistor will be turned on to provide an output. In any case, the comparator is arranged such that, when there is a ringing signal appearing between L1 and L2, then the output of the rectifier will be large enough in amplitude to be greater than the voltage from the source Vcc so that, whenever such a ringing signal is present at the input of the ringing circuit, an output will be provided by the comparator.

The ringing circuit further consists of a first oscillator 5 and a second oscillator 7. Associated with the first oscillator is a first electronic switch Sw1 and a capacitor C5, and associated with the oscillator 7 is a second electronic switch Sw2 and a capacitor C3. The output of the voltage comparator is fed to both switches Sw1 and Sw2. When an output signal is provided at the output of the comparator, then switches Sw1 and Sw2 are closed to provide a ground for the oscillator through the respective frequency determining capacitors. Electronic oscillators are well known in the art, and no further description of such oscillators is required at this point. In FIG. 1, the oscillators are illustrated schematically as including a resistor and capacitor to determine the frequency thereof.

Further associated with the first oscillator 5 is a third electronically controlled switch Sw3 along with a further frequency determining capacitor C4. The control terminal of Sw3 is connected to the output of oscillator 2, so that Sw3 will be closed, for example, at each positive half cycle of oscillator 7 and will be open on each negative half cycle thereof. Alternatively, the switch could be of such a nature that it will be closed on a first half cycle and opened on a next half cycle. The particular choice of types of switches so employed does not constitute an essential element of this invention.

However, in a purely exemplary form, the switches Sw1, Sw2 and Sw3 could be types known as analogue CMOS (complementary metaloxide semi-conductor) devices.

Figure 2B:
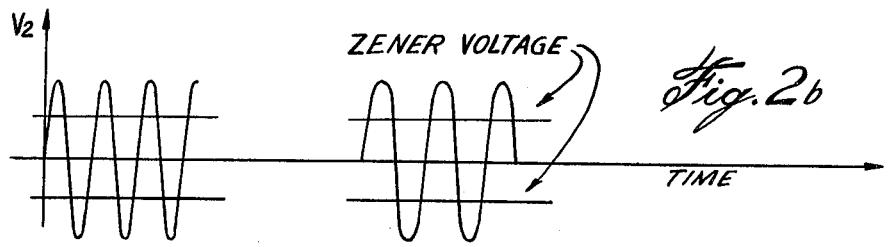
Figure 2C:
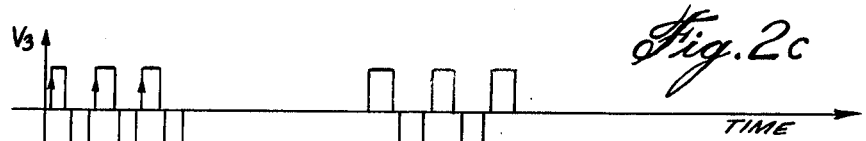
Figure 2D:
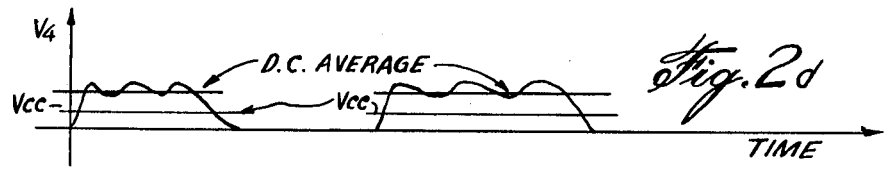

In operation, the circuit works as follows:

Under normal conditions, all of the switches Sw1 to Sw3 will be in the position shown in the drawings, i.e., they will be open so that oscillators 5 and 7 are ungrounded and, therefore, inoperative. When a ringing signal, of the type illustrated in FIG. 2A, comes over the telephone lines, the DC of the signal will be removed by the capacitor C1 to provide a signal about the zero line as shown in FIG. 2B. The Zener diodes will then clip the sine waves to provide a rectangular pulse wave as shown in FIG. 2C, and the diode D3 will clip the bottom halves of this to provide a rectangular pulse train with only the positive pulses of FIG. 2C. This pulse train will be smoothed by the capacitor C2 so that the output of the rectifier is of the form shown in FIG. 2D.

Figure 2E:
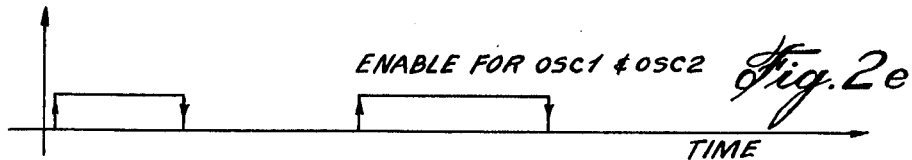

The voltage comparator 3 will provide an output as long as the input thereto is greater than the reference voltage Vcc so that the output of the voltage comparator will have the appearance as shown in FIG. 2E. The positive going signals in FIG. 2E are enable signals for oscillators 1 and 2. As seen in FIG. 1, the signals are applied to the control terminals of switches Sw1 and Sw2 to close the switches whereupon the oscillators will be grounded through the respective capacitors and be in an operative condition.

Figure 2F:
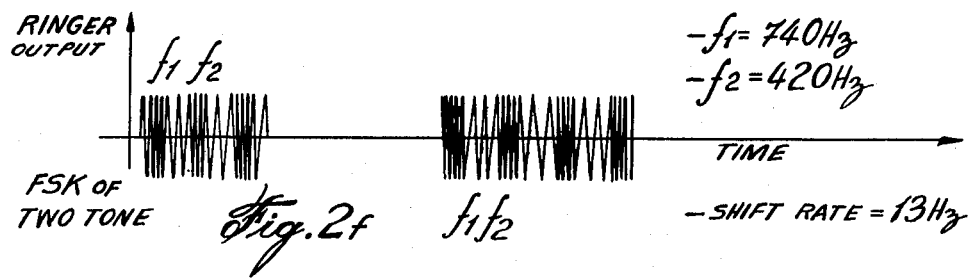

The control terminal of Sw3 is connected to the output of oscillator 7 so that switch Sw3 will be switched open and closed at a rate determined by the frequency of oscillator 7. As can be seen, the frequency of oscillator 1 is a function of the capacitor C5 when switch Sw3 is open, and a function of the capacitance of C4 and C5 in parallel when switch Sw3 is closed. Thus, the signal at the output of oscillator 5 is a multi-tone signal. The frequency of oscillator 5 changes at a rate determined by the output of oscillator 7 as shown in FIG. 2F.

The output of the ringing circuit is taken off between the output of oscillator 5 and the line of common potential and fed to a speaker or the like. Vcc, which constitutes the reference voltage for comparator 3, also provides operating power for oscillators 5 and 7.

In a preferred embodiment, the frequency of the output signal with C4 switched out is 740 Hz, and the frequency of the output signal with C4 switched in is 420 Hz. The output signal is switched between these frequencies at a rate of 13 Hz which is the frequency of oscillator 7.

As will be appreciated, it would be possible to provide an output signal having more than two tones by merely providing further frequency determining capacitors for oscillator 5 along with switching arrangements for switching the further capacitors into and out of the oscillator circuit.

Although only a preferred embodiment has been described in the foregoing, this was for the purpose of describing, but not limiting, the invention. Various modifications, which will come readily to the mind of one skilled in the art, are within the scope of the invention as defined in the appended claims.

I claim:

1. An electronic ringing circuit having two input terminals, and two output terminals connectable to speaker means, and comprising:

means for determining when a telephone ringing signal is present at said input terminals and for providing an activating signal when said telephone ringing signal is present at said input terminals;

first oscillator means, said oscillator means having an output terminal and providing output signals at a plurality of frequencies one at a time;

means for changing the frequency of the output signals of said first oscillator means;

second oscillator means having an output terminal connected to said means for changing the frequency of the output signals of said first oscillator means;

means for receiving said activating signal and for enabling said first and second oscillator means upon receipt of said activating signal;

the output terminal of said first oscillator means being connected to one output terminal of said ringing circuit and the other output terminal of said ringing circuit being connected to a point of common potential;

and further comprising a source of voltage, and terminals for connecting each of said means for determining, said first oscillator means and said second oscillator means respectively to said source of voltage;

said means for determining comprising a voltage comparator having one input thereof connected to one input terminal of said ringing circuit and a second input terminal connected to said source of voltage;

whereby, when a signal at the one input thereof is of greater magnitude than a signal at the second input thereof, an output signal is provided at the output of said voltage comparator, said output signal constituting said activating signal;

said means for enabling said first oscillator means comprising a first controllable switch means having an input terminal, an output terminal and a control terminal, and said means for enabling said second oscillator means comprises a second controllable switch means having an input terminal, an output terminal and a control terminal;

a first capacitor means connected between the input terminal of said first switch means and said point of common potential;

the output terminal of said first switch means being connected to said first oscillator means;

the output terminal of said voltage comparator being connected to the control terminal of said first switch means;

a second capacitor means connected between the input terminal of said second switch means and said point of common potential;

the output terminal of said second switch means being connected to said second oscillator means;

the output terminal of said voltage comparator being connected to the control terminal of said second switch means;

whereby, when an activating signal is provided at the output of said voltage comparator, the first and second switch means are closed to connect said first and second oscillator means to said point of common potential to enable said first and second oscillator means.

2. A ringing circuit as defined in claim 1, wherein the means for changing the frequency of the output signal of said first oscillator means comprises a third controllable switch means having an input terminal, an output terminal, and a control terminal, the output terminal of said third switch means being connected to the input terminal of said first switch means;

a third capacitor connected between the input terminal of said third switch means and said point of common potential;

the output of said second oscillator means being connected to the control terminal of said third switch means;

whereby, said third capacitor is switched into and out of the circuit of said first oscillator means at a rate determined by the frequency of the second oscillator means; the frequency of the first oscillator means being a function of the value of capacitance of the first capacitor means when the third capacitor is switched out, and a function of the value of capacitance of the first capacitance means and third capacitor in parallel when the third capacitor is switched in.

3. A ringing circuit as defined in claim 2, and further comprising a rectifying circuit between said input terminals of said ringing circuit and said means for determining.

4. A ringing circuit as defined in claim 3, wherein said rectifying circuit comprises a first capacitor having one end thereof connected to said one input terminal of said ringing circuit and the other end thereof connected to a pair of back-to-back Zener diodes;

the other side of said pair of Zener diodes being connected to a pair of resistors, the second one of said pair of resistors being connected between the junction of said resistors and said point of common potential;

a diode connected between the junction of said pair of resistors and the one input terminal of said voltage comparator; and a second capacitor connected between the other end of said diode and said point of common potential.

* * * * *